Sept. 16, 1952 E. B. ROBINSON ET AL 2,610,363
ROLLER NECK BEARING FOR TEXTILE DRAFTING MACHINES
Filed Aug. 16, 1948 4 Sheets-Sheet 1
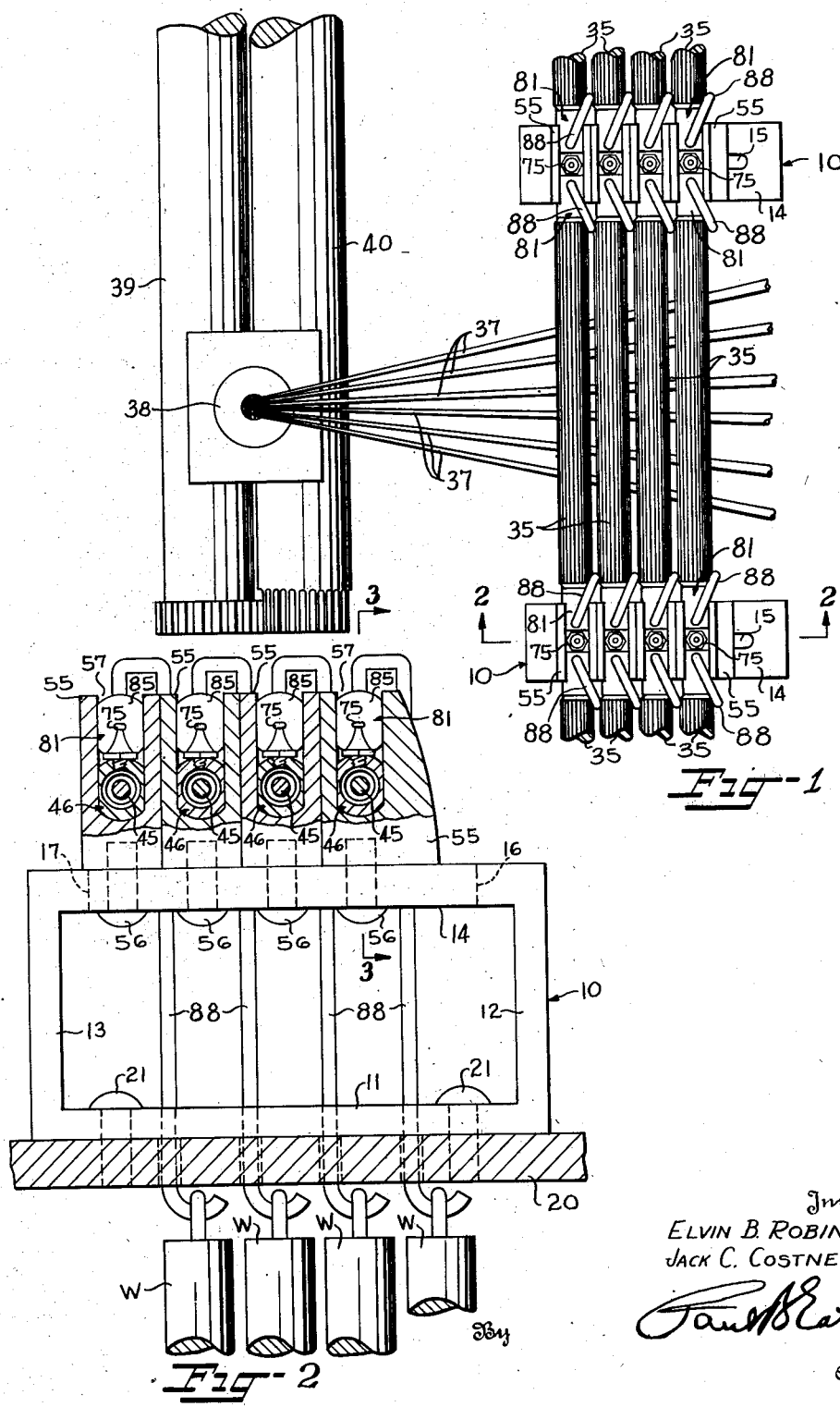
Inventor:
ELVIN B. ROBINSON and
JACK C. COSTNER.
Attorney

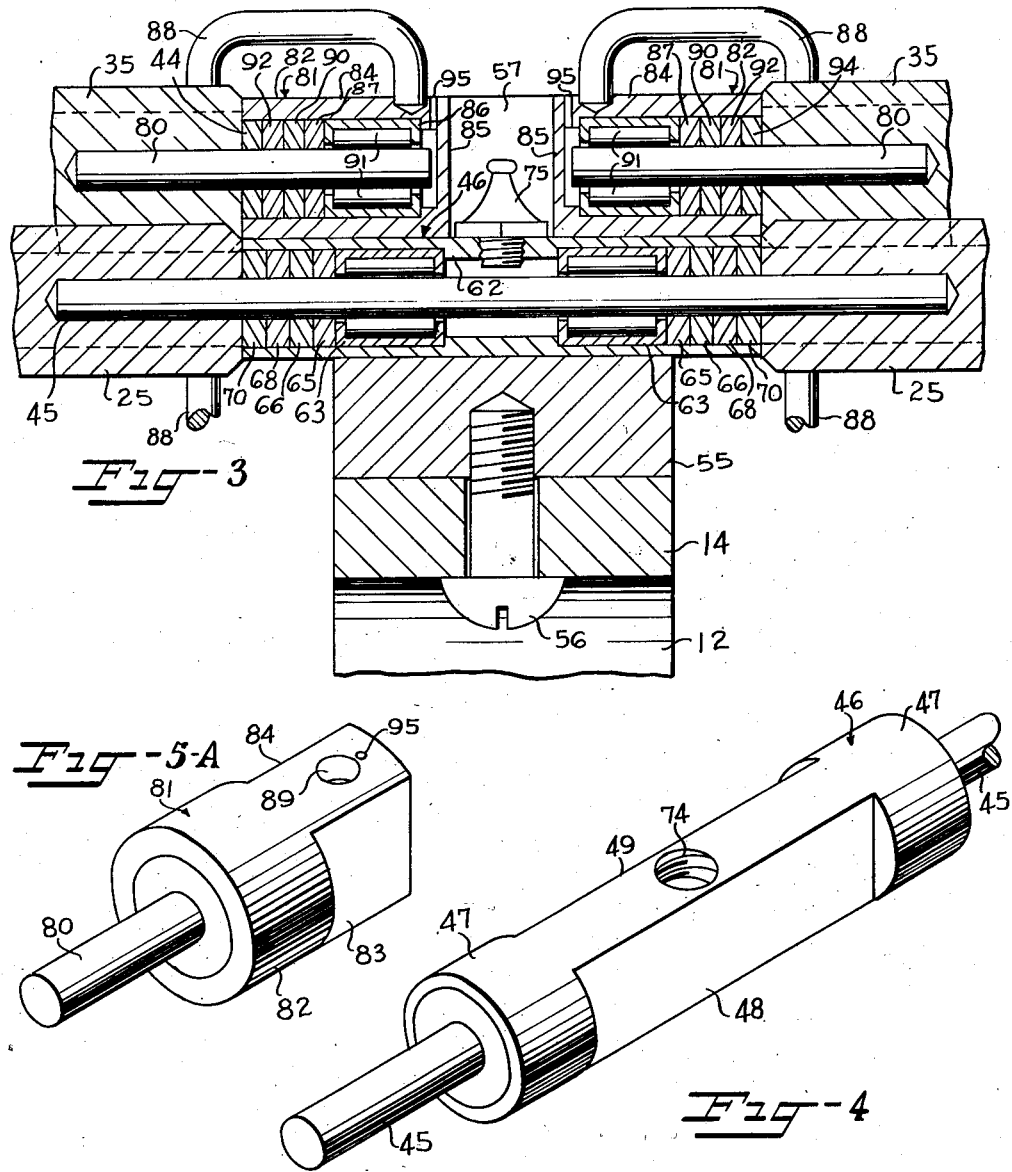

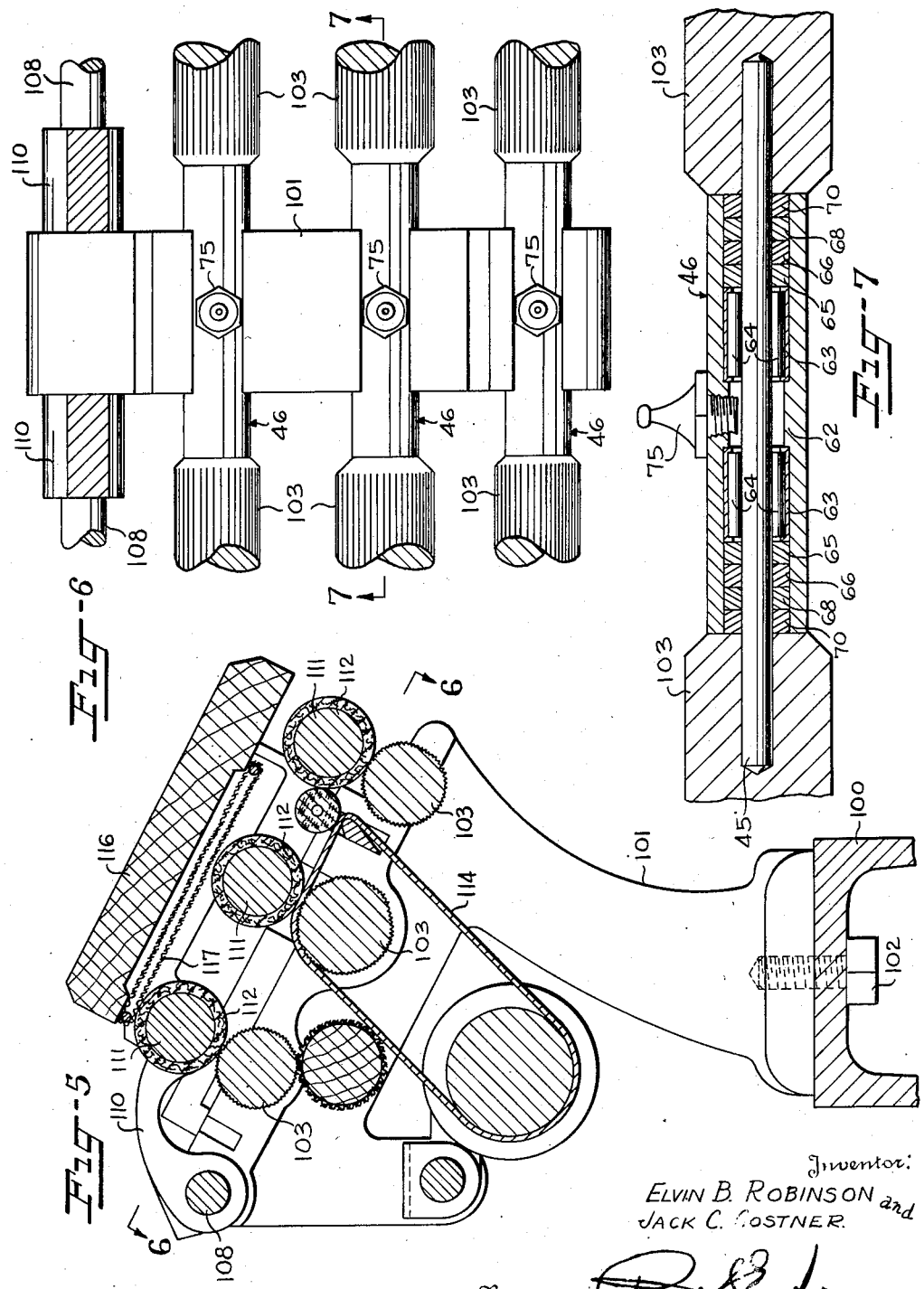

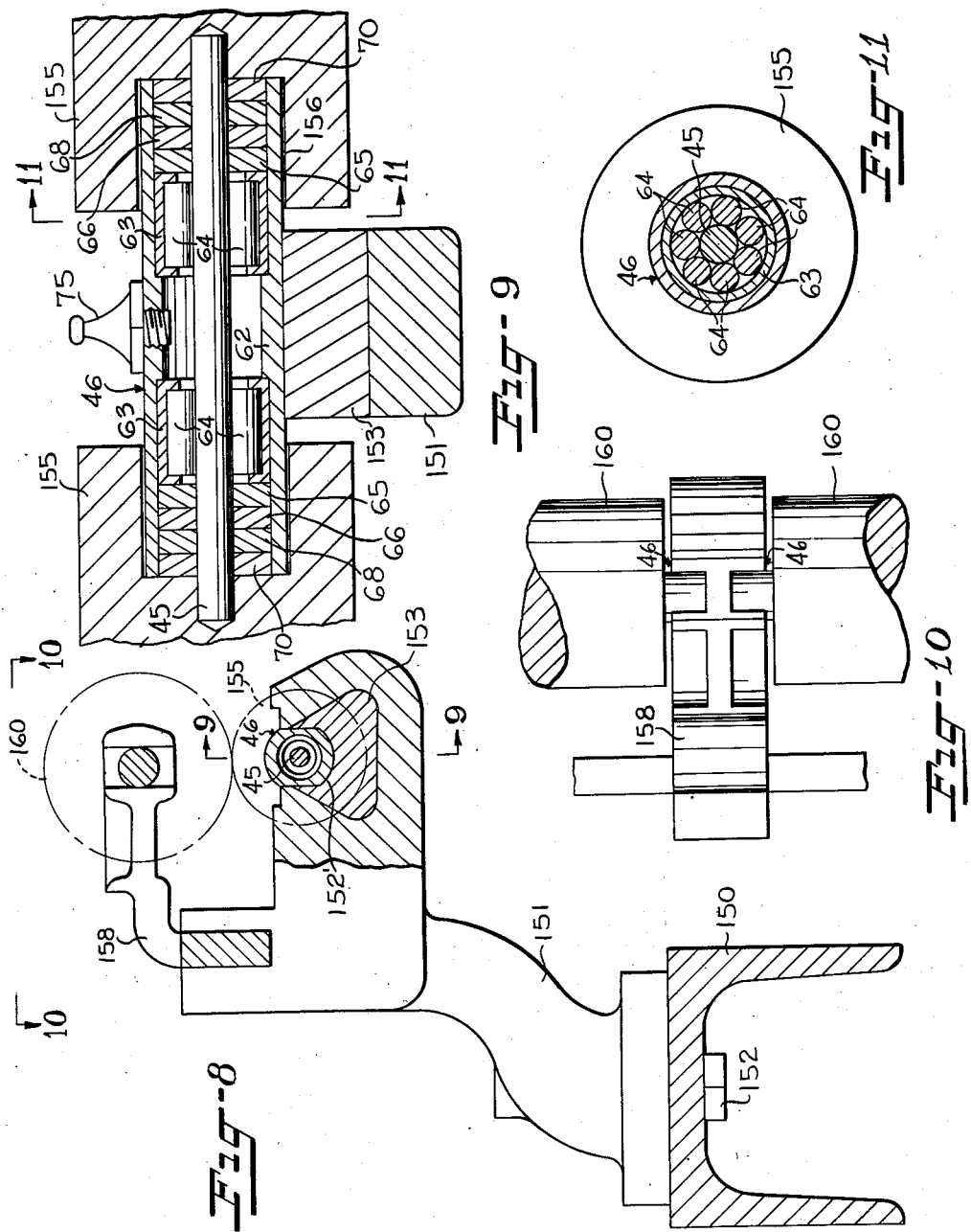

Patented Sept. 16, 1952

2,610,363

UNITED STATES PATENT OFFICE 2,610,363

ROLLER NECK BEARING FOR TEXTILE DRAFTING MACHINES

Elvin B. Robinson, Gastonia, and Jack C. Costner, Bessemer City, N. C., assignors, by direct and mesne assignments, to Ideal Industries, Inc., Bessemer City, N. C., a corporation of North Carolina Application August 16, 1948, Serial No. 44,414

3 Claims. (Cl. 19—134)

1

This invention relates to textile machinery and more especially to an improved anti-friction bearing mounting, and to improved means for mounting the drawing rolls of spinning frames, drawing frames, roving frames, twister frames and the like.

It is a well known fact that the bottom rolls of machines having top and bottom rolls, such as drawing frames and the like, are usually mounted in bearing blocks having grooves or bearing cavities therein provided with semi-circular bottom surfaces to conform to the diameter of the shaft mounted therein, and the opposite sides of each of the bearing cavities being parallel so the ends of the roller necks may be placed in the bearing without having to insert the ends of the rollers in the bearing from the sides, and bearings of this type, being friction bearings, not only become worn and collect a considerable amount of lint, dust and the like, but also are difficult to lubricate, and it is also difficult to maintain lubrication of these bearings after the ends of the rollers have been mounted therein.

It is therefore an object of this invention to provide means for mounting the bottom rollers of drawing frames in anti-friction bearings, the anti-friction bearings being disposed in tubular bearing housings which are adapted to fit in the present bearing cavities of the existing bearing blocks of the type described, and thereby requiring that no changes be made in the existing machine bearings, but providing larger diameters at the end portions of the tubular housings to accommodate the circular washers and also preventing endwise movement of the tubular housings.

It is another object of this invention to provide anti-friction bearings for supporting the bottom rolls of drawing frames and the like, which bearings may be mounted in the conventional bearing blocks of the machine without modifying the machine, said bearings having lubricating means associated therewith with means for preventing leakage of lubricant from the bearings.

Some of the objects of the invention having been stated, other objects will appear as the description proceeds, when taken in connection with the accompanying drawings, in which:

Figure 1 is a top plan view of a drawing frame showing the invention applied thereto;

Figure 2 is a vertical sectional view on an enlarged scale taken along the line 2—2 in Figure 1;

Figure 3 is an enlarged vertical sectional view taken along the line 3—3 in Figure 2;

Figure 4 is an isometric view of the improved anti-friction bearing housing removed from the machine;

Figure 5 is a vertical sectional view through a long draft spinning frame, showing the drawing rolls and the bearing associated therewith;

Figure 5-A is an isometric view of one of the bearings for the top rolls, removed from its bearing block;

Figure 6 is a top plan view taken substantially along the line 6—6 in Figure 5;

Figure 7 is a vertical sectional view taken substantially along the line 7—7 in Figure 6;

Figure 8 is a vertical sectional view showing a portion of a twister frame;

Figure 9 is an enlarged vertical sectional view taken substantially along the line 9—9 in Figure 8 and showing the improved anti-friction bearing mounting and omitting the top roll shown in dotted lines in Figure 8;

Figure 10 is a top plan view taken substantially along the line 10—10 in Figure 8;

Figure 11 is a vertical sectional view taken along the line 11—11 in Figure 9.

Referring more specifically to the drawings, the Figures 1, 2 and 3 show the improved bearing assembly as applied to a roving frame and the numeral 10 broadly designates a bearing stand having a lower horizontal portion 11, which is adapted to be secured to the main frame 20 of the machine in any suitable manner, such as by screws 21.

The bearing stand 10 also has vertical legs 12 and 13 and an upper horizontal leg portion 14, which is slotted, as at 15, from near one end to the other, or from the dotted line 16 in Figure 2 to the dotted line 17 in Figure 2. The bottom rolls of the machine are indicated at 25, while the top rolls are indicated at 35. A plurality of slivers 37 are adapted to be passed between the top and bottom rolls 35 and 25, respectively, and through a suitable eye 38, being drawn by conventional calender rollers 39 and 40. It may be observed in Figure 3 that the conventional fluted bottom rollers 25 have had the conventional roller neck portions removed from the same and the bottom rollers 25 are connected together by a shaft or roller neck 45 which is secured in the proximate ends of the fluted portion of the bottom rollers, as by a pressed fit. The shaft 45 is a part of the improved anti-friction bearing unit comprising a tubular bearing housing broadly designated at 46. This tubular housing 46 has circular end portions 47 and flattened side portions 48 and 49 extending longitudinally thereof but terminating a substantial distance from each end of the same so as to provide a substantially greater wall thickness to the portion of the tubular bearing housing which is not disposed within the groove of the bearing block. It is to be noted that the width of the bearing housing 46 is, from one flattened side to the other, the same as the diameter of the conventional roller neck portion and the diameter of the end portions 47 is usually equivalent to the pitch diameter of the flutes in the fluted rollers, the unflattened ends 47 serving as spacing bosses.

The upper surface of the horizontal portion 14 of the bearing stand 10 has a plurality of bearing blocks 55 secured thereto by means of suitable screws 56. These bearing blocks 55 are conventional and each has a conventional bearing cavity or groove 57 therein in which the tubular bearing housing 46 is adapted to be placed, the flattened portions 48 and 49 being adapted to engage the proximate surfaces of the groove 57 in the bearing block 55.

The end portions 47 of the tubular bearing housing 46 are adapted to be disposed beyond the limits of the bearing block 55. The tubular bearing housing 46 is restricted as at 62 to provide shoulders against which suitable roller bearing housings 63 having rollers 64 are adapted to fit and these housings 63 are also secured in the tubular housing 46, as by a pressed fit (Figure 3). The remote or outer ends of the roller bearings 63 are engaged by first washers 65 which are pressed in the housing 46 and in which the shaft 45 has rotational movement, while the outer surfaces of the first washers 65 are engaged by second washers 66 which are pressed onto the shaft 45 and have rotational movement in the housing 46. There are also third washers 68 which engage slidably the remote or outer surfaces of the second washers 66 and which are pressed into the housing 46 and in which the shaft 45 rotates. Rotatably mounted in the ends of the tubular housing 46 and being pressed on the shaft 45 are fourth washers 70 which slidably engage the remote or outer surfaces of the third washers 68.

A suitable grease fitting 75 is threadably imbedded in a threaded bore 74 in the housing 46 and communicates with the cavity in the housing 46 to thus admit lubricant to the bearings 63 disposed at each side of the cavity. The purpose of the washers 65, 66, 68 and 70 disposed adjacent the remote ends of the housing 46 is to confine the lubricant admitted through the fitting 75 to the area in which the roller bearings 63 are mounted.

The bearing housings for the top rollers 35 are very similar to the end portions of the tubular bearing housing 46 for the bottom rolls 25 with the exception that the proximate ends of the top rollers 35 cannot be mounted in the same bearing member, inasmuch as the top rolls 35 must raise and lower according to the density of the slivers 37 passing between the rollers 25 and 35. Therefore, the proximate ends of the rolls 35 are shown as being mounted on shafts 80 which are secured therein, as by a pressed fit, and these shafts 80 are part of anti-friction bearing units, the tubular housing of each of which is indicated broadly at 81.

Each of these units 81 comprises an end portion 82 which is tubular and the other end is flattened as at 83 and 84 at opposite sides thereof, while the proximate ends of these bearing housings 81 are closed as at 85. Each housing 81 has a cavity 89 in its upper surface for receiving a pressure hook 88, to the lower end of which is applied a weight W. The housing 81 has a roller bearing housing 86 secured therein as by a pressed fit, and in which the proximate ends of the shafts 80 are rotatably mounted. Each bearing housing has rollers 91 therein. Each of the tubular bearing housings 81 has a washer 87 pressed thereinto which engages the outer surface of the roller bearing 86 and in which the shaft 80 has rotational movement. Engaging the outer surface of the washer 87 is a similar washer 90 which is rotatably mounted within the bearing housing 81 and is pressed onto the shaft 80. Slidably engaging the outer surface of the washer 90 is another washer 92 which is pressed into the housing 81 and in which the shaft 80 has rotational movement, and the outer end of the housing 81 has a washer 94 rotatably mounted therein which is pressed on and rotates with the shaft 80.

The tubular bearing housings 81 each has a bore 95 therein which communicates with the cavity in which the roller bearing 86 is mounted to thus admit lubricant to the same, and the washers 87, 90, 92 and 94 provide a sealing means for preventing the lubricant from leaking from the area in which the roller bearing is mounted.

By referring to Figures 5, 6 and 7 it may be observed how this anti-friction bearing unit comprising the tubular housing 46 may be used for mounting the bottom rolls in a long draft spinning frame. A spinning frame of this type has a bearing block support bar 100 on which conventional bearing blocks 101 are secured, as by screws 102.

These bearing blocks 101 have suitable bearing cavities therein in which are mounted front, middle and back fluted or corrugated rolls 103. The bearing blocks are fixedly penetrated by a rod 108 on which are mounted top roll supporting members 110, there being one of these top roll supporting members disposed adjacent each side of each of the bearing blocks 101.

The roll supporting members 110 rotatably support the ends of arbors of a plurality of top rolls 111 in a conventional manner. These top rolls have conventional leather covered bosses 112 which are adapted to contact the fluted or corrugated bosses of the lower and back fluted rolls 103, the middle corrugated or fluted rolls having a conventional apron 114 passing over the same which is engaged by the middle top roll 111.

The roll supporting members 110 also support a conventional clearer board 116 having top roll clearers 117 thereon, one of which is shown in Figure 5. In this instance, the portion of the bottom roll 103 that is normally disposed between the proximate ends of the fluted portion and adjacent the bearing stands 101 is cut away and the opposite ends of the shaft 45 of the anti-friction bearing unit are fixedly mounted in the proximate ends of the fluted rollers 103. The flattened surfaces 48 and 49 of the tubular bearing housing 46 are adapted to engage the opposed surfaces of the bearing cavities in which the rollers 103 have heretofore been mounted, and the circular portion 47 of the bearing housing 46, adjacent each end thereof, is disposed outside of the bearing stand 101, and it is thus seen that this bearing unit is applicable to a spinning frame as well as to a roving frame, although it is obvious that some dimensional changes would have to be made in the anti-friction bearing unit, but there would be no changes made in the structure of the unit.

Figures 8, 9, 10 and 11 show the anti-friction bearing unit as applied to a twister frame. The twister frame has a bearing support bar 150 on which conventional bearing blocks 151 are secured, as by screws 152, there being one of these bearing blocks 151 shown in the drawings.

The bearing block 151 has a bearing member 153 mounted therein which is provided with a bearing cavity 152′, in which the conventional bottom rolls are normally mounted. However, in this instance, the flattened surfaces 48 and 49 of the bearing housing 46 are adapted to conform to the opposite sides of the cavity 152′ in the bearing member 153 and it is thus seen that the anti-friction bearing unit is mounted in the bearing member 153 in a manner identical to that described for the roving frame and the spinning frame.

Inasmuch as the proximate ends of the bottom rolls 155 are very close to the remote surfaces of the bearing stand 151, the proximate ends of each of the bottom rolls 155 has a cavity 156 therein in which the remote ends of the tubular bearing housing 46 are loosely mounted, and the shaft 45 of the anti-friction unit is fixedly mounted in the bottom rolls 155. Each of the bearing blocks 151 has a top roll bracket 158 associated therewith in which the ends of arbors of conventional top rolls 160 are mounted for rotation and these top rolls 160 are adapted to rest on the bottom rolls 155 in a conventional manner.

It is thus seen that the improved anti-friction bearing unit is also applicable to a twister frame in much the same manner as to the spinning and roving frames heretofore described.

In the drawings and specification there has been set forth a preferred embodiment of the invention, and although specific terms are employed they are used in a generic and descriptive sense only, and not for purposes of limitation, the scope of the invention being defined in the claims.

We claim:

1. An improved mounting for rolls of a roving frame and the like, said roving frame having top and bottom rolls and also having spaced bearing blocks each of which is substantially U-shaped in cross-section forming a groove therein, said improved mounting being provided for rotatably supporting the bottom rolls of the roving frame and comprising a tubular housing for each of the bearing blocks, the medial portion of which is flattened on opposite sides to fit into the groove in each of the bearing blocks, opposed ends of the tubular housing extending beyond the corresponding bearing block and being of substantially greater diameter than the width of the groove in the bearing block, the central portion of the tubular housing having a restricted bore forming shoulders at each end thereof, a pair of spaced roller bearing housings mounted in the tubular housing in axial alinement with each other and being pressed against said shoulders, said roller bearing housings being spaced inwardly from the opposed outer ends of the tubular housing, first washers fixedly mounted in the tubular housing and engaging the surfaces of said spaced roller bearing housings nearest opposed ends of the tubular housing, a shaft extending axially through and beyond each end of the tubular housing, said shaft being mounted for rotational movement in the roller bearing housings and the washers, second washers slidably and rotatably engaging the surfaces of the first washers nearest opposed ends of the tubular housing and being pressed onto the shaft and also being rotatably mounted in the tubular housing, third washers slidably and rotatably engaging the surfaces of the second washers nearest opposed ends of the tubular housing and being fixedly mounted in the tubular housing and the shaft being rotatably mounted in the third washers, fourth washers slidably and rotatably engaging the surfaces of the third washers nearest opposed ends of the tubular housing and being rotatably mounted in the housing and also being fixedly mounted on the shaft, a grease fitting penetrating the wall of said tubular housing at a point between the spaced roller bearing housings and through which a lubricant may be introduced into the area in which the roller bearing housings are disposed and the arrangement of said washers providing a seal against leakage of the lubricant from the tubular housing and whereby the bottom rolls may be fixedly mounted on the portions of said shaft which extend beyond each end of the tubular housing.

2. In a textile machine in which rolls are employed for drafting textile fibers, said machine having axially alined sections of bottom rolls and also having top rolls and also having spaced bearing blocks provided with bearing cavities, at least one tubular bearing housing having flattened sides along its medial portion disposed in the cavity of each of the bearing blocks and engaging the side walls of the bearing cavities to prevent rotation of the tubular bearing housing, a shaft connecting adjacent sections of the bottom rolls and each shaft being mounted in a separate one of the tubular bearing housings, each tubular bearing housing having a restricted bore intermediate its ends providing a shoulder at each end thereof and a plurality of circularly arranged rollers on each side of the restricted bore and surrounding said shaft and in which the shaft may rotate, a pair of roller bearing housings encircling said rollers and being pressed against said shoulders the opposed outer ends of the tubular bearing housing having a pair of spaced washers secured therein and the shaft having a washer secured thereon and occupying the space between the first-named washers.

3. In a textile machine in which rolls are employed for drafting textile fibers, said machine having axially alined sections of bottom and top rolls and also having spaced bearing blocks provided with bearing cavities, at least one tubular bearing housing having flattened sides along its medial portion disposed in the cavity of each of the bearing blocks and engaging the side walls of the cavity to prevent rotational movement of the tubular bearing housing relative to its cavity, a shaft connecting adjacent sections of the bottom rolls and each shaft being mounted in a separate one of the tubular bearing housings, each tubular bearing housing having a restricted bore intermediate its ends forming a shoulder at each end thereof, a roller bearing housing on each side of the restricted bore and pressed against said shoulder, the outer ends of the tubular bearing housing extending beyond the bearing blocks being circular and having a pair of spaced washers secured therein and the shaft having a washer secured thereon and occupying the space between the first-named washers and an upwardly projecting lubricant fitting mounted in the medial portion of each tubular bearing and having communication with the restricted bore therein between the proximate ends of said roller bearing housings disposed on opposed sides of the restricted bore.

ELVIN B. ROBINSON.
JACK C. COSTNER.

REFERENCES CITED

The following references are of record in the file of this patent:

UNITED STATES PATENTS

| Number | Name | Date |
|---|---|---|
| 1,696,938 | Curtis | Jan. 1, 1929 |
| 1,742,553 | Motte | Jan. 7, 1930 |
| 1,958,412 | Andrada et al. | May 15, 1934 |
| 2,412,357 | Robinson | Dec. 10, 1946 |
| 2,530,094 | Stearns | Nov. 14, 1950 |

FOREIGN PATENTS

| Number | Country | Date |
|---|---|---|
| 455,518 | Great Britain | Oct. 22, 1936 |
| 475,322 | Germany | Apr. 22, 1929 |
| 678,180 | Germany | July 10, 1939 |